United States Patent
Kim et al.

(10) Patent No.: US 7,058,290 B1
(45) Date of Patent: Jun. 6, 2006

(54) METHOD FOR SUPPORTING A STILL PICTURE OF DATA STREAM RECORDED IN A DISK RECORDING MEDIUM

(75) Inventors: Byung-Jin Kim, Kyunggi-do (KR); Kang-Soo Seo, Kyunggi-do (KR); Jea-Yong Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 940 days.

(21) Appl. No.: 09/698,263

(22) Filed: Oct. 30, 2000

(30) Foreign Application Priority Data

Oct. 30, 1999   (KR) ............................... 1999-47843

(51) Int. Cl.
  *H04N 5/85*  (2006.01)
  *H04N 5/91*  (2006.01)
(52) U.S. Cl. .................... 386/126; 386/125; 386/120
(58) Field of Classification Search ............... 386/126, 386/125, 124, 109, 111, 112, 27, 33, 105, 386/106, 46, 45, 40, 1, 121, 120
See application file for complete search history.

(56) References Cited

U.S. PATENT DOCUMENTS 6,470,140 B1 * 10/2002 Sugimoto et al. ............. 386/95
2002/0176695 A1 * 11/2002 Sawabe et al. ............... 386/95

* cited by examiner

*Primary Examiner*—Robert Chevalier
(74) *Attorney, Agent, or Firm*—Birch Stewart Kolasch & Birch LLP

(57) ABSTRACT

The present invention relates to a data recording method for enabling a digital television to present a part of digital stream recorded in a disk such as a high-density digital versatile disk (HD-DVD) as a still picture, and a method for providing a digital television with still information based on the recorded data stream. The method includes writing, in the data area, a stream including at least one still picture and at least one presentation information, a presentation of the still picture being defined by the presentation information, and writing, in the navigation area, information associated with the existence of the still picture in the stream.

16 Claims, 4 Drawing Sheets a still packet which may include duration information

'1B' indicates that there are 27 still pictures

METHOD FOR SUPPORTING A STILL PICTURE OF DATA STREAM RECORDED IN A DISK RECORDING MEDIUM

BACKGROUND OF THE INVENTION

1. Field of the Invention

The present invention relates to a data recording method for enabling a digital television to present a part of digital data stream recorded in a disk such as a high-density digital versatile disk (HD-DVD) as a still picture, and a method for providing a digital television with still information based on the recorded data stream.

2. Description of the Related Art

A high-density digital versatile disk (HD-DVD), whose recording standard is under discussion among related companies, is a high-capacity storage device for moving pictures of large size, so that it will be widely used soon. In the meantime, a disk reproducing device (referred as 'HDVD player' hereinafter) which is being developed to reproduce a high-density digital versatile disk is expected to be connected with a digital television through IEEE 1394 standard when it playbacks an inserted disk.

When a HDVD player is connected with a digital television to playback a HD-DVD, it should have specific video pictures to be displayed as still images on a screen of a digital television. Examples of the specific video pictures are a background image of menu bars for selection of various functions provided from a HD-DVD, and a menu screen for editing a content scenario of a moving picture program recorded in a HD-DVD.

To embody still picture of data stream recorded in a DVD-ROM which is being popularized more and more, a still mark is written behind a data stream section corresponding to a still picture, and a DVD-ROM player, which can reproduce a DVD-ROM disk, repeats to output the last-decoded stream section if a still mark is detected while reproducing recorded programs.

This method is possible since a DVD-ROM player has been developed in expectation that it is to be connected with an analog television not equipped with a MPEG decoder. If it has a MPEG decoder as an internal component, then a DVD-ROM player can detect still marks contained in data streams while decoding the data streams recorded in a DVD-ROM disk.

However, a HDVD-player may not have a MPEG decoder as an internal component since it is under development on assumption that it may be connected with a digital television equipped with a MPEG decoder though a digital interface such as IEEE 1394 as aforementioned.

Therefore, even though still marks are inserted in every data stream section corresponding to still pictures in a HD-DVD as in a DVD-ROM, a HDVD player can not conduct a still operation if it has no decoder, that is, it can not detect the still mark.

In addition, a digital television developed at present can not support the still function for a data stream when it receives the data stream from a HDVD player connected through a digital interface, so that it is urgently required to develop a method of presenting a specific data stream section from a disk device such as a HDVD player in a still picture at a digital television.

SUMMARY OF THE INVENTION

It is an object of the present invention to provide a method of recording still information, which is identifiable at a digital television, in a high-density disk, and a method for enabling a digital television to present a part of digital stream corresponding to a still picture received through a digital interface such as IEEE 1394 as a still picture based on the furnished still information or data stream.

A still picture supporting method according to an embodiment of the present invention, when recording video data in an optical disk, writes still information indicating that a video data stream section is to be presented as a still picture, and writes information in a cell on whether there is a still picture in a stream object containing the video data stream section wherein the cell is linked with the stream object.

Another still picture supporting method according to an embodiment of the present invention, when recording video data in an optical disk, records video data in a streaming format, and writes a transport packet indicating that a data section among the recorded video data is still picture at a neighboring side of the data section, wherein the contents of the transport packet are not decoded when reproducing the recorded video data.

Another still picture supporting method according to an embodiment of the present invention, when reproducing a data stream recorded in an optical disk comprising a recorded video data stream, still information indicating that a video data stream section among the recorded video data stream is to be presented as a still picture, and information written in a cell on whether there is a still picture in a stream object containing the video data stream section wherein the cell is linked with the stream object, checks whether a video data reproduced from the disk is corresponding to a still picture, and conducts an iteration of transmitting a predictive picture data of the reproduced video data repeatedly after transmitting the reproduced video data based on the checked result.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
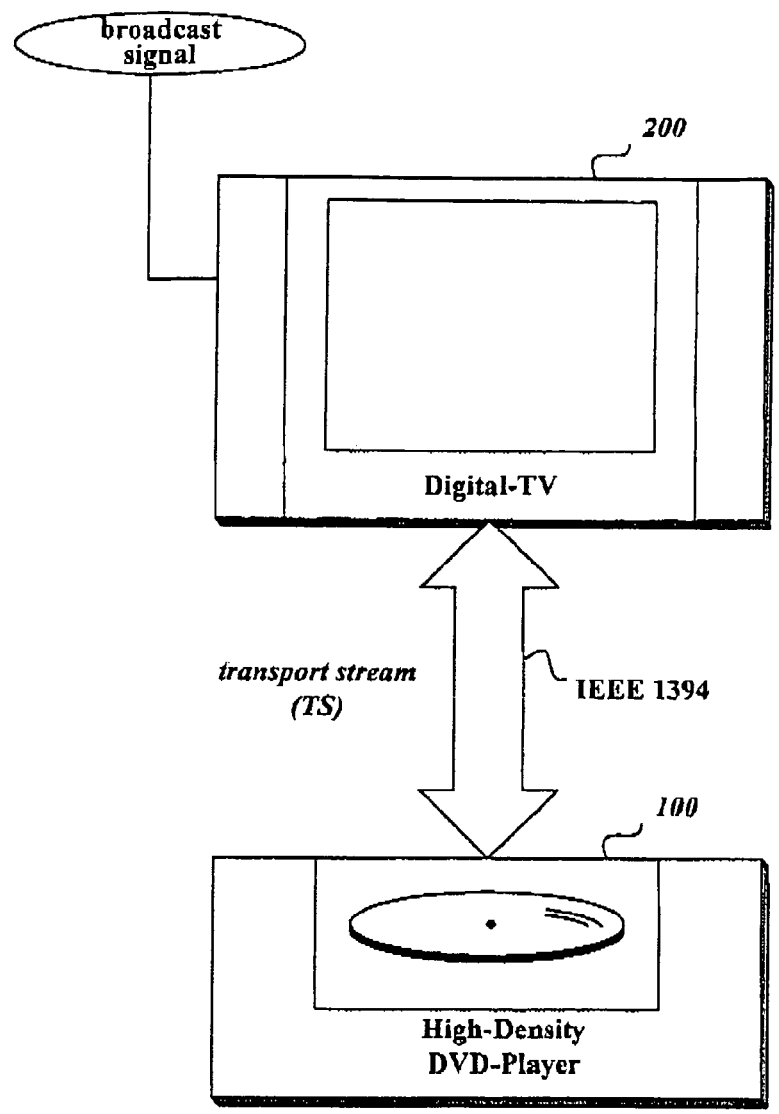
FIG. 1 shows a digital television and a HDVD player to which a method for supporting a still picture of data stream recorded in a disk according to the present invention is applied.

FIG. 1 shows a digital television 200 and a HDVD player 100 to which a method for supporting a still picture of data stream recorded in a disk according to the present invention is applied. The digital television 200 and the HDVD player 100 are connected each other through an IEEE 1394 digital interface.

The data written in a HD-DVD which is to be playbacked in the HDVD player 100 is grouped into high-density stream objects (called 'HOBs' hereinafter). A HOB may correspond to a single program or a digital stream recorded from recording start to stop, and it is to be associated with each cell which is used for determining the playback sequence of moving picture contents recorded in the HD-DVD.

Figure 2:
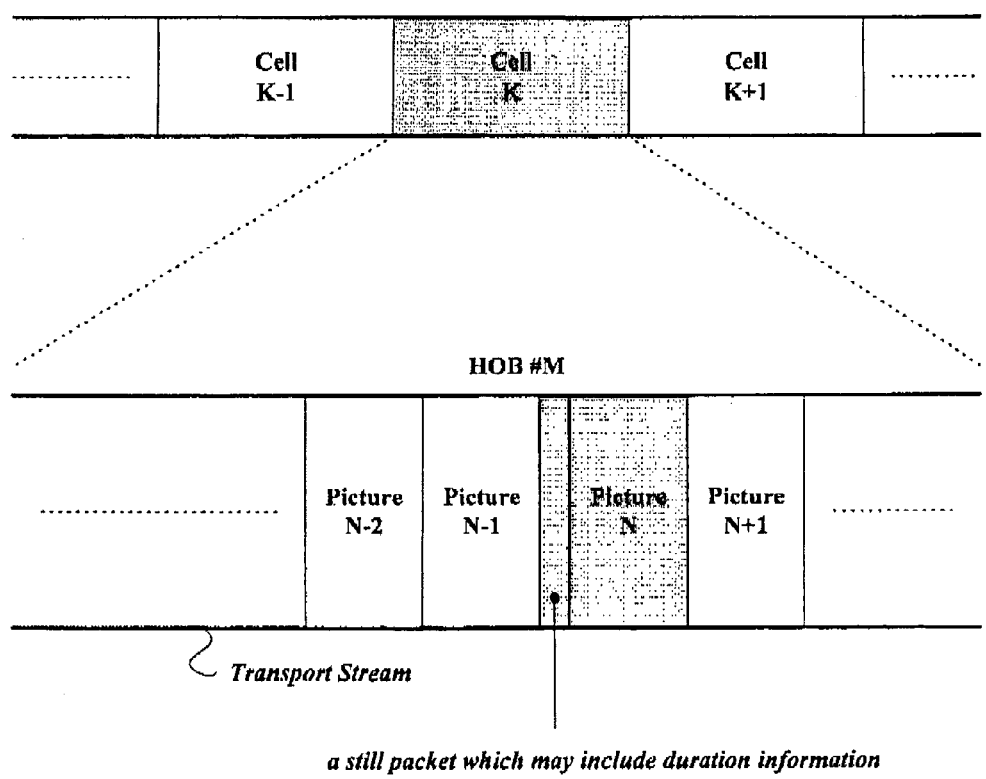
FIG. 2 shows a format example of a recorded stream to embody a still picture supporting method according to the present invention.

FIG. 2 shows a format example of a recorded stream to embody a still picture supporting method according to the present invention.

As shown in FIG. 2, the data stream belonging to a certain HOB contains a still packet as still information. The function of a still packet is to command the digital television 200 to repeat the decoding of a stream constituting a single picture following the still packet, instead of advancing the reproduction. A still packet contains still duration information indicating how long the requested still operation should last. The still duration is classified into two types: the definite and the indefinite. The definite type may have a time value ranging from 1 to 254 seconds, and the indefinite type is used in a condition that a key command from a user is necessary.

When the data stream recorded as in FIG. 2 is reproduced in the HDVD player 100 and is transmitted to the digital television 200 through the isochronous channel of the IEEE 1394 digital bus, the still packet is also transmitted to the digital television 200 without being decoded. When the digital television 200 receives the still packet while decoding the received data stream into real video and/or audio signal, it extracts still duration information from the received still packet. After that, the digital television 200 decodes the data stream section, which follows the still packet and corresponds to a single picture, and then repeats outputting of the just-decoded video picture during the time indicated by the extracted still duration information.

If the time indicated by the still duration information expires, the digital television 200 stops repeating the decoding of the same picture (still picture), and then resumes the decode next pictures, which may have been already stored in an internal buffering memory, succeeding the still picture.

Through the above-explained operations, a picture can be held as a still picture in a digital television for a certain time.

In the above-explained embodiment of the still picture supporting method, an additional command for holding a picture and resuming successive decoding need not be sent from the HDVD player 100 to the digital television 200.

Instead of positioning a still packet before a still picture, a still packet may be preceded by a still picture. In this case, the HDVD player 100 may turn its mode into a pause without advancing to the next pictures as soon as it identifies a packet as a still packet based on a packet header. And the digital television 200 repeats decoding a partial data stream, which is received prior to a still packet, and constitutes a single pictures when the received packet is determined as a still packet. This interoperation between the HDVD player 100 and the digital television 200 can also achieve the still function.

As a variation, the still packet may not contain information on the still duration. Instead, the HDVD player 100 resumes data reproduction from recorded data following the still packet and transmits the reproduced data stream to the digital television 200 if a user requests release of still status. According to the resumption of data reproduction, the digital television 200 receives data packets next to the still packet, then it acknowledges the receipt of data packet as release of still picture, and decodes the received data packets as soon as it stops the repetition of decoding the still picture.

Figure 3A:
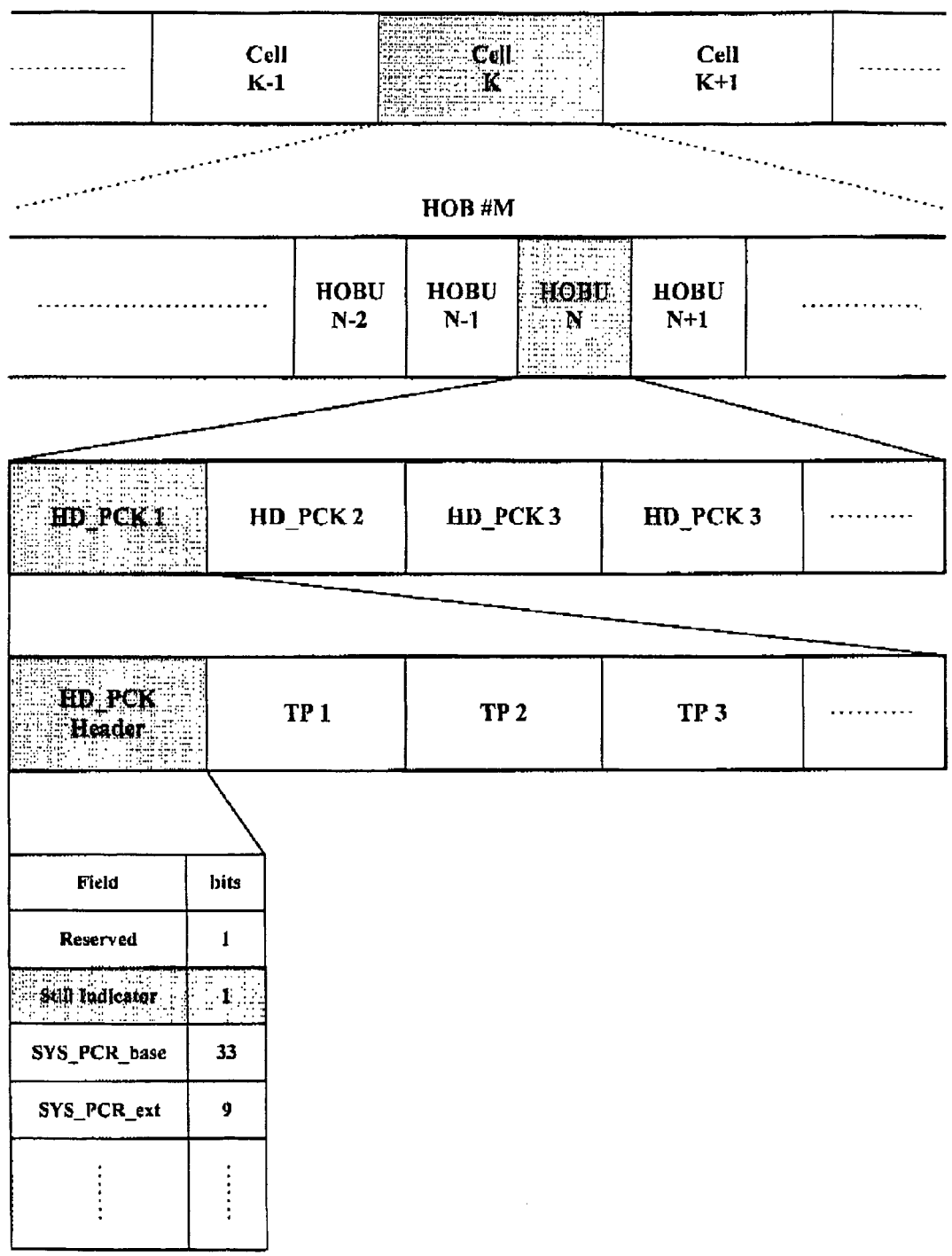
FIG. 3A shows a format example of a recorded stream to embody another still picture supporting method according to the present invention.

FIG. 3A shows another format example of a recorded stream to embody a still picture supporting method according to the present invention.

As explained above referring to FIG. 2, the data written in a HD-DVD which is to be playbacked in the HDVD player 100 is grouped into HOBs. A HOB is also corresponding to a single program or a digital stream recorded from recording start to stop, and it is related with each cell which is used for determining the playback sequence of moving picture contents recorded in a HD-DVD.

And, a HOB is composed of high-density stream object units (referred 'HOBUs' hereinafter), and a data stream constituting a HOBU is recorded across a plurality of data packs as shown in FIG. 3A. A data pack is a data accessing unit whose size is physically readable and/or writable at a time, that is, it corresponding corresponds to a sector of a DVD-ROM. Each data pack is composed of a pack header and several transport packets written in it.

The pack header comprises fields of 'STILL Indicator', 'SYS_PCR_base', 'SYS_PCR_ext, and 'Reserved'. A transport packet may contain a program clock reference (PCR) which has a 9-bit extension value and a 33-bit base value according to the MPEG standard. The extension value is a modulo-300 counter that is incremented at a rate of 27 MHz, whereas the base value is incremented at a rate of 90 KHz. If a transport packet contains a PCR, the PCR is copied to the fields of 33-bit 'SYS_PCR_base' and 9-bit 'SYS_PCR_ext', respectively. The field of 'STILL Indicator' is a 1-bit flag and is used to indicate whether or not a data pack has data stream to be transmitted repeatedly. That is, if the flag is 1, it means that the pack and following packs including data of Infra-coded picture (I-picture) and predictive pictures (P-picture) should be transmitted repeatedly.

Figure 3B:
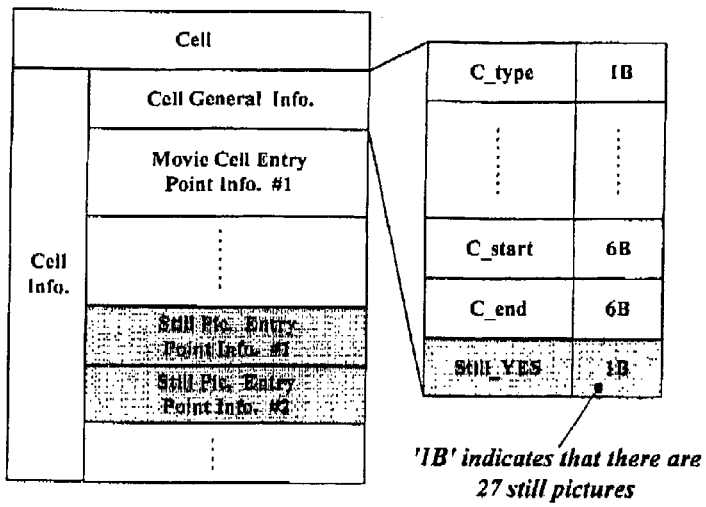
FIG. 3B shows an information example written in a cell associated with a stream object containing a still picture data.

In addition, a cell associated with a HOB containing one or more still pictures has general information and still picture entry point information as shown in FIG. 3B. The general information ahs various information on reproduction sequence of still pictures, whether there is a still picture or not, and the number of still pictures. And, the still picture entry point information ahs information indicating all of HOBUs in which data stream sections corresponding to still pictures are written. The information on whether there is still picture or not and the number of still pictures is written in 1-byte field of 'Still_YES'.

Therefore, when reproducing a HD-DVD, the HDVD player 100 examines information written in a cell to know whether there is a still picture and where the still picture is written among many HOBUs, and searches for a corresponding HOBU based on the known information. Then, it examines the successive pack headers belonging to the HOBU to know whether the value of 'STILL Indicator' field is 1 or not.

Figure 4:
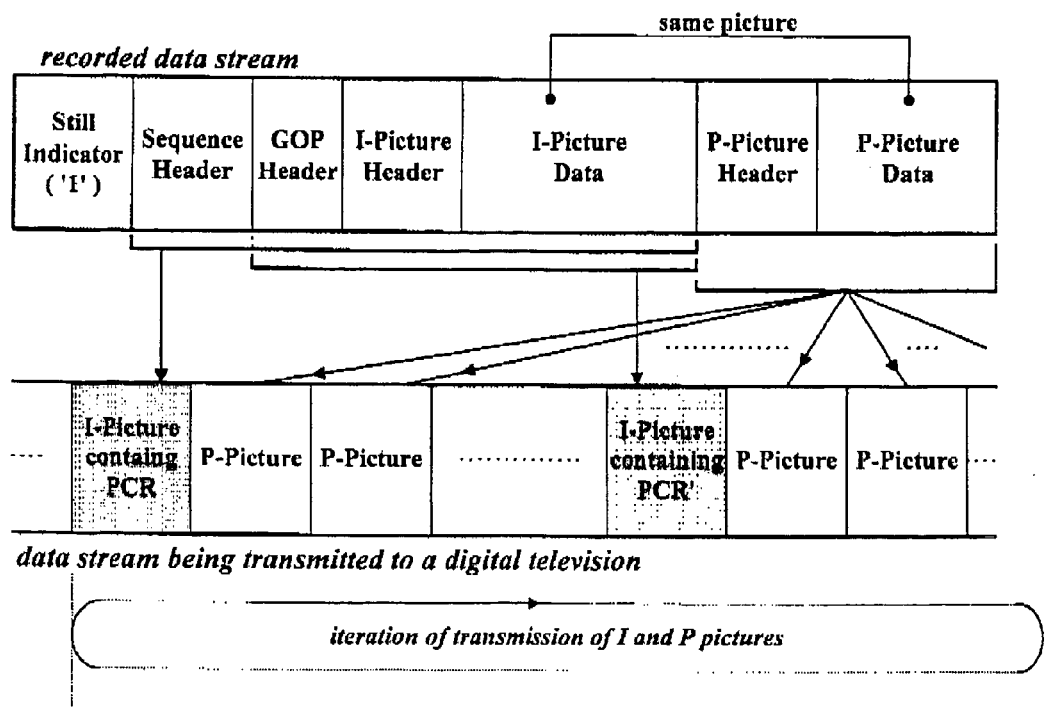
FIG. 4 shows a transmission example of a recorded stream corresponding to a still picture according to another embodiment of the present invention.

If the value is 1, the HDVD player 100 reads a data stream section containing I-picture data and next P-picture data only and then repeats to transmit the read data stream section to the digital television 200 as shown in FIG. 4. The I-picture data is composed of a sequence header, a header group of picture (GOP), and real video data, and the P-picture data is composed of a header and predictive real data.

The transmission ratio of I-picture to P-picture is 1:15. That is, a I-picture is transmitted once every 15 transmission of P-picture. When transmitting the I-picture repeatedly, the HDVD player 100 generates a PCR whose value is a transporting time of each transport packet constituting the I-picture, and inserts it into every packet or every few packets. When transmitting P-pictures repeatedly, the HDVD player 100 transmits the P-picture header only, without transmitting predictive real data.

The information on the repetition duration, i.e., still duration, may be written in a cell or a pack header. If this information has been written, the HDVD player 100 resumes the next reproduction after stopping the transmitting of the repetition when the still duration expires. If the information has not been written, it resume the next reproduction when a user requests to do that.

In this embodiment of the still picture supporting method, the digital television 200 does not need to conduct an additional operation for still mode. Instead, it just conducts a normal operation to decode the received data stream section provided repeatedly from the HDVD player 100.

The still picture supporting method according to the present invention makes it possible to present a background image of menu bars for selection of various functions provided from a HD-DVD and a menu screen for editing a content scenario of a moving picture program recorded in a HD-DVD as a still picture on a digital television on condition that a HDVD player is delivering real data in the format of data stream to a digital television connected through a digital interface such as IEEE 1394.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of writing information for supporting at least one still picture recorded on a recording medium, the recording medium including at least one data area and at least one navigation area, the method comprising the steps of:
   (a) writing, in the data area, a stream including at least one still picture and at least one presentation information, a presentation period of the still picture being defined by the presentation information; and
   (b) writing, in the navigation area, information associated with the existence of the still picture in the stream.

2. The method as set forth in claim 1, wherein said step (b) further writes, in the navigation area, information identifying the number of still pictures.

3. The method as set forth in claim 1, wherein said step (a) writes the presentation information in a header of a sector of the data area in which the still picture is written.

4. The method as set forth in claim 1, wherein the still picture is at least one Infra-coded picture (I-picture) or predictive picture (P-picture).

5. A disk device for managing reproduction of still picture recorded on a recording medium, the recording medium including at least one data area and at least one navigation area, the device comprising:
   a recording part to record, in the data area, a stream including at least one still picture and at least one presentation information, a presentation period of the still picture being defined by the presentation information,
   the recording part also recording, in the navigation area, information associated with the existence of the still picture in the stream.

6. The disk device as set forth in claim 5, wherein the recording part further records, in the navigation area, information identifying the number of still pictures.

7. The disk device as set forth in claim 5, wherein the presentation information is recorded in a header of a sector of the data area in which the still picture is recorded.

8. A method of writing information for supporting still picture of data stream recorded in an optical disk, comprising the steps of:
   (a) recording video data in a streaming format; and
   (b) writing a transport packet indicating that a data section among the recorded video data is a still picture at a neighboring side of the data section, wherein the contents of the transport packet is not decoded when reproducing the recorded video data.

9. A data reproducing method for a recording medium including at least one data area and at least one navigation area, the data area storing a stream including at least one still picture and at least one presentation information, the presentation information defining a presentation period of the still picture, the navigation area storing information associated with the existence of the still picture in the stream, the method comprising the steps of:
   (a) checking the navigation area to determine whether a video data reproduced from the recording medium corresponds to a still picture; and
   (b) presenting the still picture from the data area based on the checked result for the presentation period specified in the presentation information.

10. The method as set forth in claim 9, wherein the presentation information is stored in a header of a sector of the data area in which the still picture is stored.

11. The method as set forth in claim 9, wherein the at least one still picture includes at least one I-picture and at least one P-picture.

12. The method as set forth in claim 9, wherein the navigation area further stores therein information identifying the number of still pictures, such that said step (b) conducts the presenting for the identified number of still pictures.

13. The method as set forth in claim 11, wherein an iterative transmission ratio of the I-picture to the P-picture is 1:N wherein N is greater than 1.

14. The method as set forth in claim 1, wherein the navigation area is a cell information area separate from the data area.

15. The method as set forth in claim 5, wherein the navigation area is a cell information area separate from the data area.

16. The method as set forth in claim 9, wherein the navigation area is a cell information area separate from the data area.

* * * * *